United States Patent
Morgan et al.

(10) Patent No.: US 12,174,436 B2
(45) Date of Patent: Dec. 24, 2024

(54) PACKAGE EXPANDED BEAM CONNECTOR FOR ON-PACKAGE OPTICS

(71) Applicant: Intel Corporation, Santa Clara, CA (US)

(72) Inventors: Wesley Morgan, Lake Oswego, OR (US); Srikant Nekkanty, Chandler, AZ (US); Todd R. Coons, Gilbert, AZ (US); Gregorio R. Murtagian, Phoenix, AZ (US); Xiaoqian Li, Chandler, AZ (US); Nitin Deshpande, Chandler, AZ (US); Divya Pratap, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 760 days.

(21) Appl. No.: 17/214,035

(22) Filed: Mar. 26, 2021

(65) Prior Publication Data

US 2022/0308294 A1   Sep. 29, 2022

(51) Int. Cl.
*H04B 10/00*   (2013.01)
*G02B 6/42*   (2006.01)

(52) U.S. Cl.
CPC ........ *G02B 6/4204* (2013.01); *G02B 6/4261* (2013.01); *G02B 6/4278* (2013.01); *G02B 6/4292* (2013.01)

(58) Field of Classification Search
CPC .. G02B 6/4204; G02B 6/4261; G02B 6/4278; G02B 6/4292; G02B 6/423; G02B 6/4257; G02B 6/43; G02B 6/3886; G02B 6/3885; G02B 6/32; G02B 6/3897; G02B 6/30
See application file for complete search history.

(56) References Cited

U.S. PATENT DOCUMENTS

| 2019/0094460 A1* | 3/2019 | Brusberg ............... G02B 6/403 |
| 2019/0293876 A1* | 9/2019 | Fortusini .............. G02B 6/3893 |
| 2019/0391350 A1* | 12/2019 | Evans .................. G02B 6/4292 |
| 2022/0308294 A1* | 9/2022 | Morgan ............... G02B 6/4261 |

OTHER PUBLICATIONS

Extended European Search Report for European Patent Application No. 22150645.4 mailed Jun. 9, 2022, 7 pgs.
Office Action for European Patent Application No. 22150645.4 mailed Jun. 5, 2024, 6 pgs.

* cited by examiner

*Primary Examiner* — Agustin Bello
(74) *Attorney, Agent, or Firm* — Schwabe, Williamson & Wyatt P.C.

(57) ABSTRACT

Embodiments disclosed herein include photonics packages and systems. In an embodiment, a photonics package comprises a package substrate, where the package substrate comprises a cutout along an edge of the package substrate. In an embodiment, a photonics die is coupled to the package substrate, and the photonics die is positioned adjacent to the cutout. In an embodiment, the photonics package further comprises a receptacle for receiving a pluggable optical connector. In an embodiment, the receptacle is over the cutout.

25 Claims, 8 Drawing Sheets

PACKAGE EXPANDED BEAM CONNECTOR FOR ON-PACKAGE OPTICS

GOVERNMENT LICENSE RIGHTS

This invention was made with Government support under Agreement No. HR0011-19-3-0003, awarded by DARPA. The Government has certain rights in the invention.

TECHNICAL FIELD

Embodiments of the present disclosure relate to electronic packages, and more particularly to pluggable connectors for expanded beam coupling for on-package optics.

BACKGROUND

The microelectronic industry has begun using optical connections as a way to increase bandwidth and performance. Typically, the optical connections include optical fibers that are mounted to v-grooves on the edge of the photonics die. The optical fibers include a pigtail design that is terminated with a multi-channel (MT) type optical fiber ferrule. Package handling and surface mount technology (SMT) is challenging with the pig tail type connector. For example, there may be up to 24 fibers per die and up to 6 photonics dies per package. A single fiber alignment issue would led to a defect unit which is a large waste for die/package/assembly processes. Assuming a 99% yield for each fiber alignment in the v-groove, the overall yield projection of having all fibers properly aligned in the v-grooves is only 23.5%.

Additionally, the chosen length for the standard pigtail will not be ideal in certain platform situations. This would require extra bends and/or extra connections, and result in added link loss. Furthermore, automation for high volume manufacturing (HVM) is challenging with pigtail and MT ferrules needing manual handling and plugging/unplugging.

EMBODIMENTS OF THE PRESENT DISCLOSURE

Figure 1A:
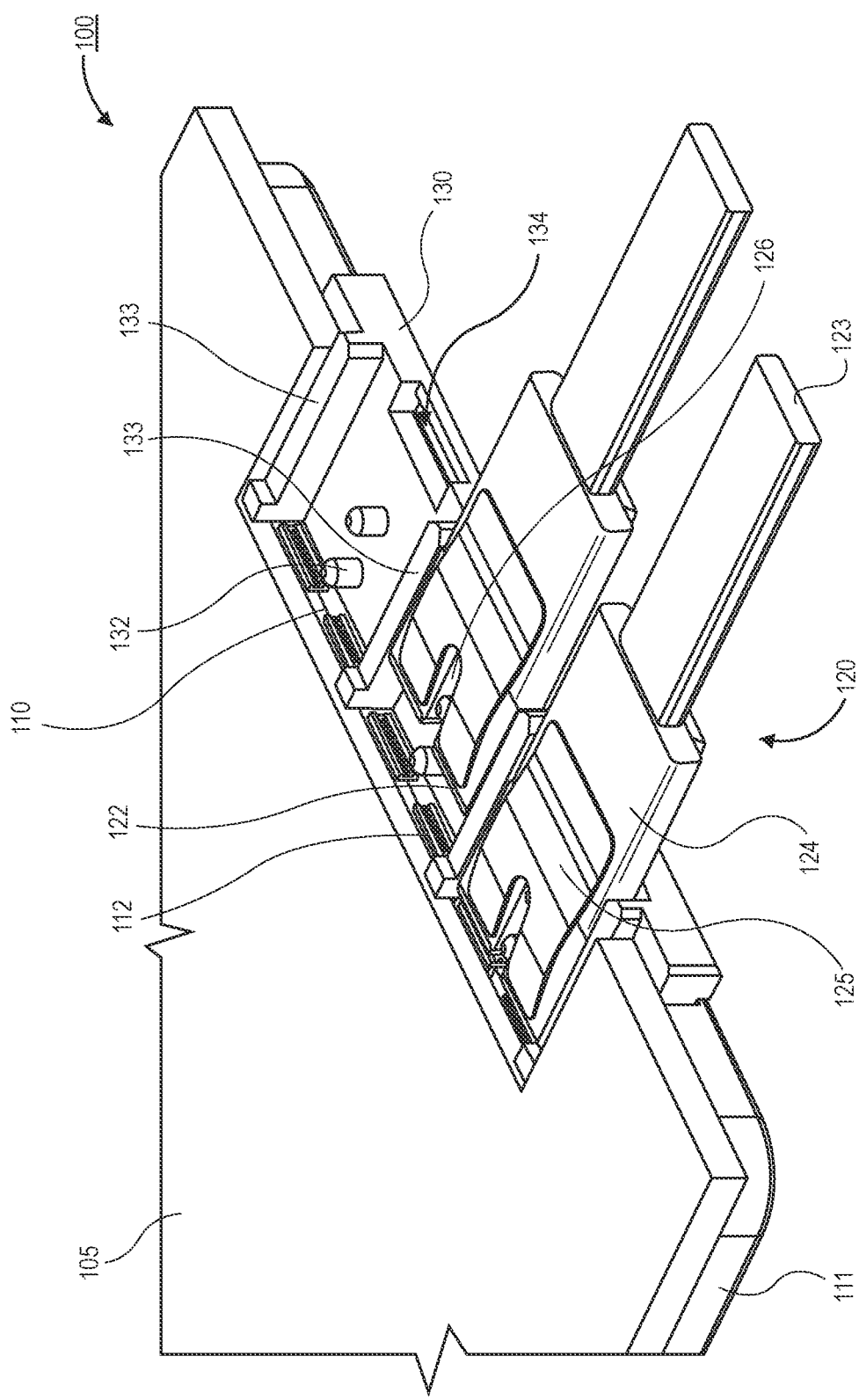
FIG. 1A is a perspective view illustration of a photonics package with a receptacle attached to the package substrate to enable pluggable expanded beam connectors, in accordance with an embodiment.

Described herein are pluggable connectors for expanded beam coupling for on-package optics, in accordance with various embodiments. In the following description, various aspects of the illustrative implementations will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative implementations. However, it will be apparent to one skilled in the art that the present invention may be practiced without the specific details. In other instances, well-known features are omitted or simplified in order not to obscure the illustrative implementations.

Various operations will be described as multiple discrete operations, in turn, in a manner that is most helpful in understanding the present invention, however, the order of description should not be construed to imply that these operations are necessarily order dependent. In particular, these operations need not be performed in the order of presentation.

As noted above, pigtail connectors for optical fiber connections to a photonics die are limited in several ways. For example, even at high yields per fiber, across all of the fibers of a photonics package, a significant yield issue arises. Additionally, the pigtail structure leads to difficult assembly conditions and is not suitable for all high volume manufacturing (HVM) instances. In yet another embodiment, the length of the pigtail may not be suitable for all application spaces.

Accordingly, embodiments disclosed herein include pluggable connectors. The pluggable connectors allow for improved ease of assembly and reduces costs. Additionally, embodiments may utilize expanded beam coupling. That is, a die side lens and a plug side lens allow for the optical beam to be collimated and expanded at the die-plug interface. The larger optical beam allows for improved alignment tolerances and allows for improved yields.

A package integrated plug receptacle will have tight alignment to a photonics die having an expanded beam lens attached to its edge with fine alignment to the photonic waveguides. The receptacle will have an alignment surface with guide pins to receive and align a plug body where fiber ends are terminated with an expanded beam lens. The plug aligns to the receptacle by constant contact between its top surface and a flat surface on the receptacle. The constant contact may be achieved from a spring component integrated into either the plug body or the receptacle body. Guide pins on the receptacle interface to an open slot in the plug to allow both vertical and horizontal insertion and/or extraction. The optical connection is made as the two lenses are aligned using passive alignment features.

In an embodiment, the micro lens array on the die side can be attached at the die level. This potentially can enable optical testing at the die level before packaging, and enable known good die assembly. Additionally, embodiments avoid the fiber ribbon pigtails during assembly, and ease the assembly complexity. The pluggable lens may also provide customer friendly solutions for board level assembly. In an embodiment, fine alignment of the plug side lens to the die side lens enables optimal coupling efficiency. In an embodiment, top down assembly of the processor (e.g., CPU or XPU) into a socketed optical connector allows for HVM friendly and more easily automated package assembly and test platforms and processes. Additionally, the optical connections and the electrical connections may be integrated into a single socket design in some embodiments. This provides a simplified bill of materials (BOM) and assembly with platform/socket receptacles providing gross pre-alignment, coupling forces, and retention. In some embodiments, side plugging and extraction are enabled which allows for plugging or extraction that is independent of socket or heat sink attachment. Furthermore, the expanded beam connections are less prone to degradation due to dust and debris. In yet another advantage, the lenses are aligned but touch free. The guide pins can act as hard stops to limit plug position in order to maintain clearance between the two lenses. This isolates and protects the photonics die from any direct plugging forces.

Referring now to FIG. 1A, a perspective view illustration of a photonics package 100 is shown, in accordance with an embodiment. In an embodiment, the photonics package 100 comprises a package substrate 105. The package substrate 105 may comprise conductive features (e.g., traces, pads, vias, etc.) for providing electrical routing in the photonics package 100. In an embodiment, an edge of the package substrate 105 may comprise a cutout. The cutout may be filled by a plug receptacle 130. The plug receptacle 130 will be described in greater detail below.

In an embodiment, a plurality of photonics dies 110 may be provided over the package substrate 105. The edge of the photonics dies 110 may be provided along the recessed edge of the cutout in the package substrate 105. The edge surfaces of the photonics dies 110 may be covered by lens arrays 112. The lens arrays 112 may comprise a plurality of lenses that are aligned with an optical waveguide in the photonics dies 110. The lenses may be collimating lenses that expand the beam from the optical waveguide. The photonics dies 110 (and a processor die (not shown)) may be covered by a lid 111. The lid 111 may be an integrated heat spreader (IHS) that provides thermal regulation to the photonics dies 110 and the processor die.

In an embodiment, the photonics dies 110 may each comprise a first lens array 112 and a second lens array 112. For example, each lens array 112 may provide lenses over twelve optical waveguides for a total of twenty-four lenses. The two lens arrays 112 may be spaced apart from each other by a gap that is aligned with alignment posts 132 on the receptacle 130. However, in other embodiments, a single lens array 112 may extend across all of the waveguides of the photonics die 110.

The photonics dies 110 may be any suitable photonics die. Particularly, the photonics dies may include functionality to convert an optical signal to an electrical signal and/or to convert an electrical signal to an optical signal. In an embodiment, optical signals are received by or propagated from an optical waveguide embedded in the photonics dies. Instead of using v-groove interfaces, the one or more lens arrays 112 allow for external optical coupling with a pluggable connector, described in greater detail below. As such, the photonics dies 110 do not suffer from the same drawbacks described above with respect to the use of pigtail like connectors.

In an embodiment, the receptacle 130 is coupled to package substrate 105. As shown, outer ledges along ends of the receptacle 130 are adhered to the surface of the package substrate 105 on which the photonics dies 110 are mounted. For example, the receptacle 130 may be adhered to the package substrate 105 with an adhesive, such as an epoxy or the like. While a particular mounting architecture is shown in FIG. 1A, it is to be appreciated that the receptacle 130 may be coupled to the package substrate 105 using any suitable architecture. As noted above, the receptacle 130 fills the cutout in the package substrate 105 in some embodiments.

In an embodiment, the receptacle 130 may comprise one or more regions for receiving plugs 120. For example, three regions are shown in the embodiment shown in FIG. 1A. Each region may be aligned with one of the photonics dies 110, so that each photonics die 110 can receive a separate plug 120. In an embodiment, the regions may be separated from each other by walls 133. The walls 133 may be used to guide the plugs 120 into the receptacle 130. That is, the walls 133 may provide a gross alignment of the plugs 120.

In an embodiment, each region of the receptacle 130 may comprise a clip anchor 134 or other fastener mechanism. The clip anchor 134 may interface with the plug 120 to securely retain the plug in the receptacle 130. The clipping mechanism of the plugs 120 is not visible in FIG. 1A, but will be described in greater detail below.

In an embodiment, each receptacle 130 may also comprise an alignment feature. For example, a pair of posts 132 may be provided in each region of the receptacle 130. The posts 132 center the incoming plug 120 and prevent rotation of the plug 120. In some embodiments, the pair of posts 132 may be replaced with an elongated ridge that provides similar functionality. In some embodiments, the posts 132 may also provide a hard stop that prevents plugging forces from contacting the lens arrays 112. That is, the posts 132 stop the plug 120 from being inserted so that the plug directly contacts the lens arrays 112.

In an embodiment, the plugs 120 may comprise a fiber ribbon 123 and a plug housing 124. Optical fibers may pass through the plug housing 124 and exit via the fiber ribbon 123. In an embodiment, ends of the optical fibers are covered by a plug side lens array 122. The plug side lens array 122 may comprise a collimating expanded beam lens. The plug side lens array 122 may be split into a first lens array 122 and a second lens array 122. The two lens arrays 122 may be separated from each other by an alignment notch 126 formed into the plug housing 124. The alignment notch 126 may be sized to accommodate the alignment posts 132. As the plug 120 is inserted into the receptacle 130, the alignment notch 126 receives the alignment posts 132 in order to properly align the plug side lens arrays 122 with the die side lens arrays 112. The alignment posts 132 and the alignment notch 126 may provide a gross alignment for the lens arrays 122 and 112. A fine alignment may be provided by features on the lens arrays 112 and 122, which will be described in greater detail below.

In an embodiment, the plug 120 may also be split in half and connected together by a spring or other compliant material. Such an embodiment may provide for a tighter fit to the alignment posts 132 and improve alignment. In such an embodiment, a width of the alignment notch 126 may be slightly smaller than a diameter of the alignment posts 132.

During insertion of the plug 120, the alignment notch 126 is forced wider by the alignment posts 132. The additional spring or other compliant material holding the halves together will then apply a force to secure the sides of the notch 126 directly against the alignment posts 132.

In an embodiment, the plug 120 may further comprise a spring 125. The spring 125 may provide constant pressure to secure the plug 120 in the receptacle 130. The spring 125 may be on a surface of the plug 120 opposite from the clipping mechanism in some embodiments. For example, the spring 125 is shown on the top surface of the plugs 120 in FIG. 1A. In an embodiment, the spring 125 may have a first end (i.e., right side in FIG. 1A) that is fastened to the plug 120, and a second end (i.e., left side in FIG. 1A) that is free to move. The second end is compressed towards the plug housing 124 by a plate over the receptacle 130 (not shown in FIG. 1A) in order to provide constant contact with the receptacle 130. While the spring 125 is shown as being on the plug 120, it is to be appreciated that the spring 125 may optionally be integrated with the receptacle 130 in some embodiments as well.

In an embodiment, the spring 125 comprises a notch at the second end. The notch in the spring 125 may be aligned with the alignment notch 126 in the plug housing 124. As such, the spring 125 may extend to and beyond the location of the alignment posts 132. While a single spring 125 is shown in FIG. 1A, it is to be appreciated that other embodiments may include a pair of springs 125, with each spring 125 being on either side of the notch 126. Additionally, while an example of a cantilevered spring 125 is shown in FIG. 1A, it is to be appreciated that any spring architecture may be used to provide constant contact with the receptacle 130, such as a wave spring or a compliant material pad.

Figure 1B:
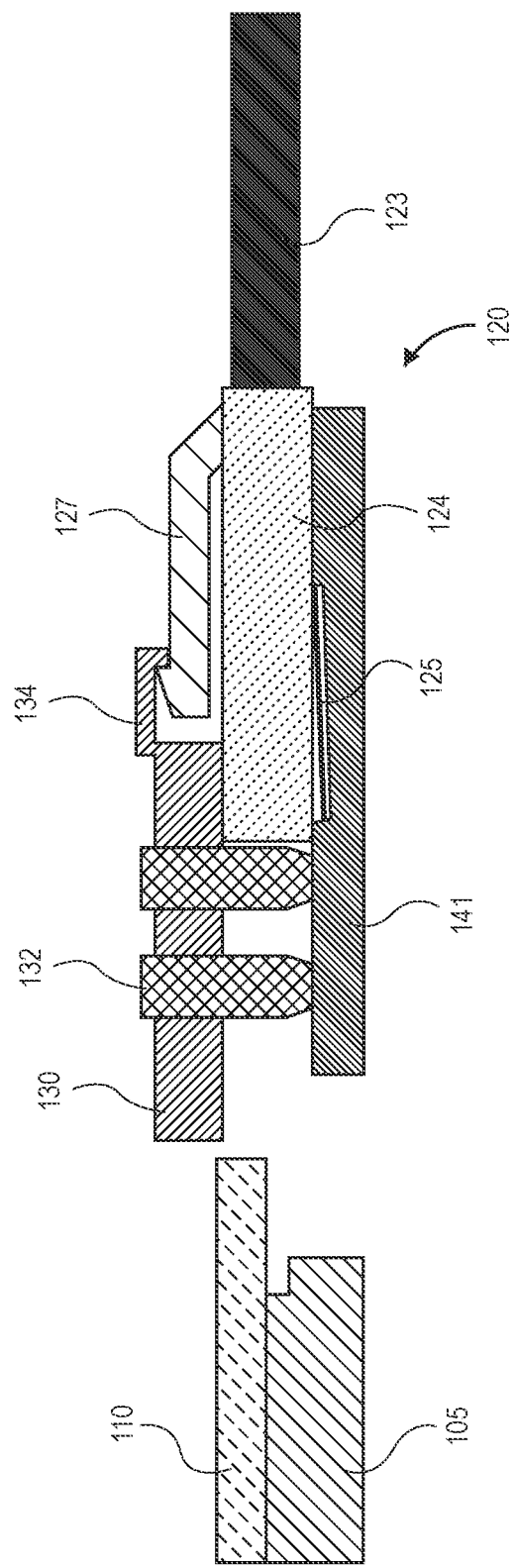
FIG. 1B is a cross-sectional illustration of the photonics package through a plane that includes the alignment pins of the receptacle, in accordance with an embodiment.

Referring now to FIG. 1B, a cross-sectional illustration of the plug 120 in the receptacle 130 is shown, in accordance with an embodiment. In an embodiment, the cross-sectional illustration is through a plane that includes the alignment posts 132. The receptacle 130 is shown detached from the package substrate 105 and the photonics die 110. However, it is to be appreciated that the receptacle 130 may be coupled to the package substrate 105 outside of the plane illustrated in FIG. 1B. As shown, the plug 120 comprises a fiber ribbon 123 and a plug housing 124. The plug housing 124 is inserted into a gap between the receptacle 130 and a plate 141. The plate 141 may be integrated with the receptacle 130. In other embodiments, the plate 141 may be connected to the underlying board (not shown).

The plug 120 is inserted into the receptacle 130 until an end of the plug housing 124 contacts one of the alignment posts 132. The stop provided by the alignment post 132 prevents the plug 120 from being inserted too far so that the lenses of the die side lens array and the plug side lens array contact each other. As such, plugging forces are not transferred to the photonics dies.

As shown in FIG. 1B, a latching mechanism 127 is provided on the plug housing 124. The latching mechanism 127 may interface with the clip anchor 134 on the receptacle. For example, the latching mechanism 127 may include a clip end that is depressed during insertion, and is released within the clip anchor 134 to prevent removal of the plug 120. When the plug 120 needs to be extracted, the clip is depressed and the plug 120 can slide out. As such, the latching mechanism 127 allows for easy insertion and removal of the plug 120. While a snap hook architecture is shown, it is to be appreciated that other latching mechanisms may also be used, in accordance with various embodiments. For example, as will be described in greater detail below, the latching mechanism 127 may comprise a magnetic feature. Other embodiments may include, but are not limited to, a snap hook with a release tab, a separate retention clip that snaps or screw on to the structure, a retaining screw between the receptacle 130 and the plug 120, or a snap like structure that only interfaces with the receptacle with no retention tied to the CPU package.

In an embodiment, the plug 120 may further comprise a spring 125 on a surface opposite from the latching mechanism 127. As shown in FIG. 1B, the right end of the spring 125 is secured to the plug housing 124, and the left end of the spring 125 presses against the plate 141. In an embodiment, a trench in the plate 141 may be provided to accommodate the spring 125. In other embodiments, the trench is omitted and the spring 125 presses against the flat surface of the plate 141. The spring 125 allows for a constant pressure to be applied between the plug housing 124 and the receptacle 130 in order to allow for proper alignment of the optical features (out of the plane of FIG. 1B).

Figure 1C:
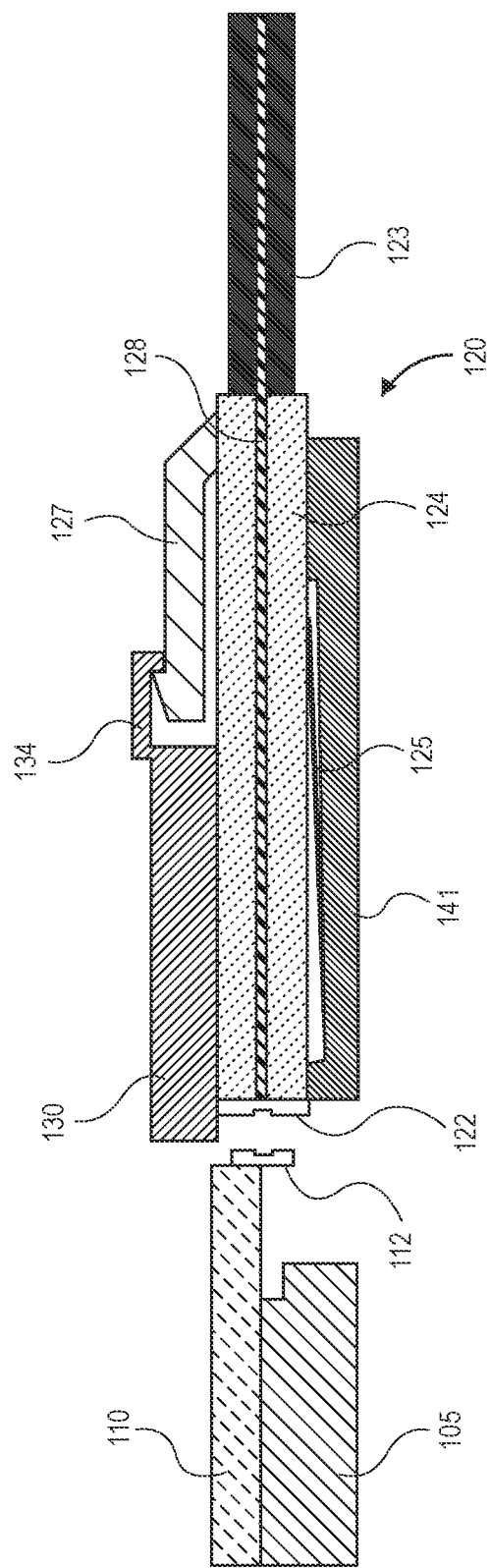
FIG. 1C is a cross-sectional illustration of the photonics package through a plane that includes an optical fiber, in accordance with an embodiment.

Referring now to FIG. 1C, a cross-sectional illustration of the plug 120 in a receptacle 130 is shown, in accordance with an additional embodiment. The plane shown in FIG. 1C is through an optical fiber 128 in the plug 120. The receptacle 130 is shown detached from the package substrate 105 and the photonics die 110. However, it is to be appreciated that the receptacle 130 may be coupled to the package substrate 105 outside of the plane illustrated in FIG. 1C. A first end (left side in FIG. 1C) of the optical fiber 128 terminates at the plug side lens array 122. The plug side lens array 122 may be aligned with a die side lens array 112. As such, optical signals from the optical fiber 128 may be propagated to the photonics die 110 and vice versa.

The cross-sectional illustration in FIG. 1C also illustrates features that were present in FIG. 1B. For example, the plug 120 may also comprise a latching mechanism 127 that interfaces with a latch anchor 134 on the receptacle 130. Additionally, a portion of the spring 125 may extend substantially along a length of the plug housing 124. That is, the spring 125 does not necessarily end at that alignment posts 132, as shown in FIG. 1B.

In an embodiment, a single optical fiber 128 is shown in FIG. 1C. However, it is to be appreciated that any number of optical fibers 128 may be provided in the plug 120. For example, an eight fiber plug 120, a sixteen fiber plug 120, or a twenty four fiber plug 120 may be used in some embodiments. In a particular embodiment, a first set of optical fibers 128 may be provided on one side of the alignment posts 132 and a second set of optical fibers 128 may be provided on a second side of the alignment posts 132. Each set of optical fibers 128 may comprise their own lens array 122.

Figure 2A:
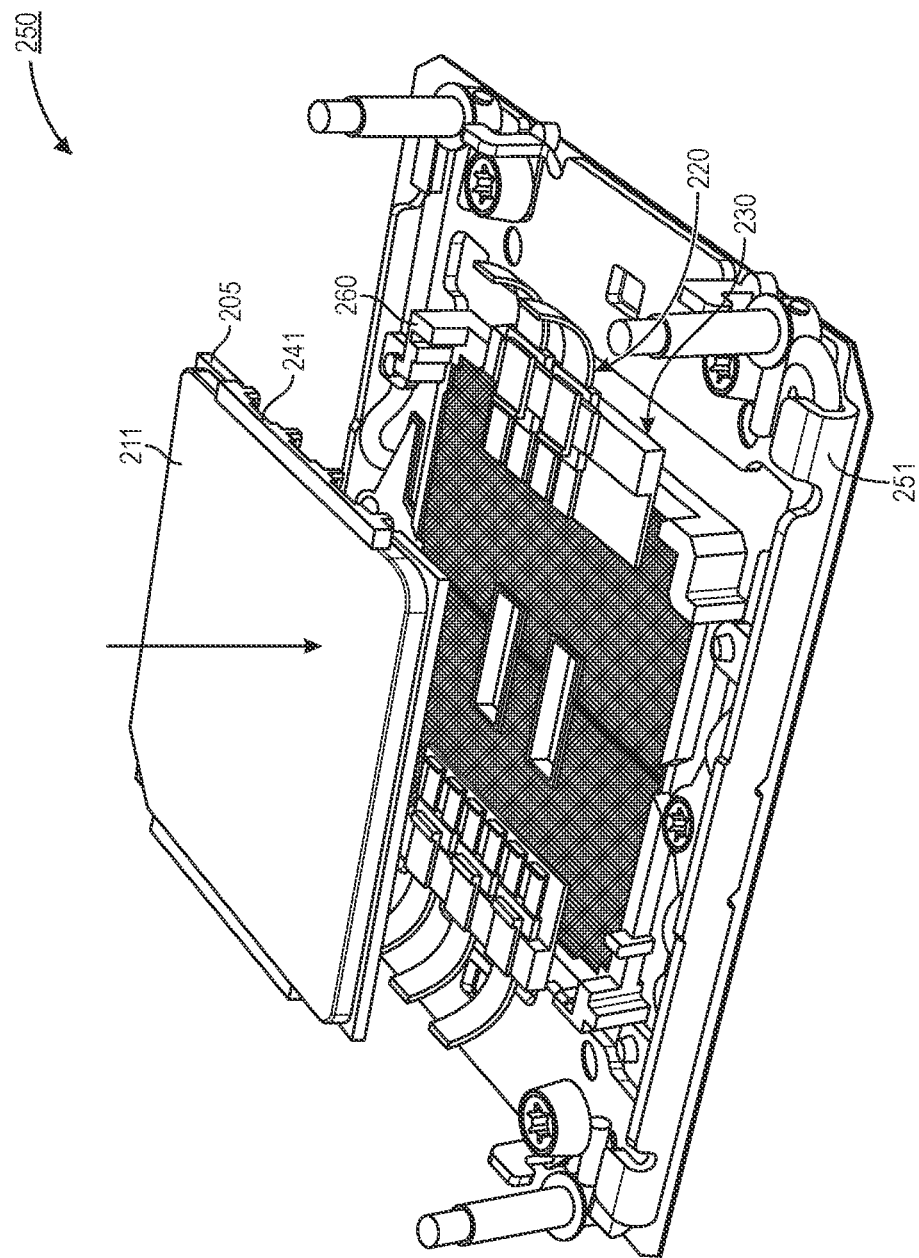
FIG. 2A is a perspective view illustration of a photonics system that includes a receptacle for pluggable expanded beam connectors where the receptacle is integrated with a socket, in accordance with an embodiment.

Referring now to FIG. 2A, a perspective view illustration of a photonics system 250 is shown, in accordance with an embodiment. In an embodiment, the photonics system 250 illustrates the package substrate 205 and the lid 211 above a socket 260. The socket 260 may be coupled to a board (not shown) by a socket loading mechanism 251. In an embodiment, the socket 260 may comprise the receptacles 230 for receiving the plugs 220. As shown, the plugs 220 may be inserted into the receptacles 230 before the package substrate 205 is connected to the socket 260. In such an embodiment, the plate 241 that presses against the spring of the plug 220 may be integrated with the package substrate 205.

As indicated by the arrow, the package substrate 205 may be connected via a top down socketing attachment. In such an instance, the receptacle 230 only needs to provide gross pre-alignment and temporary retention, and the placement of the package substrate 205 with the plate 241 secures the plugs 220 in place. The plugs 220 may be inserted into the receptacle 230 vertically or from the side. While shown as being integrated with the socket 260, alternative embodiments may include a receptacle that is an integrated component or separate part attached to the socket, heat sink, socket loading mechanism 251, motherboard, or BGA packages.

Figure 2B:
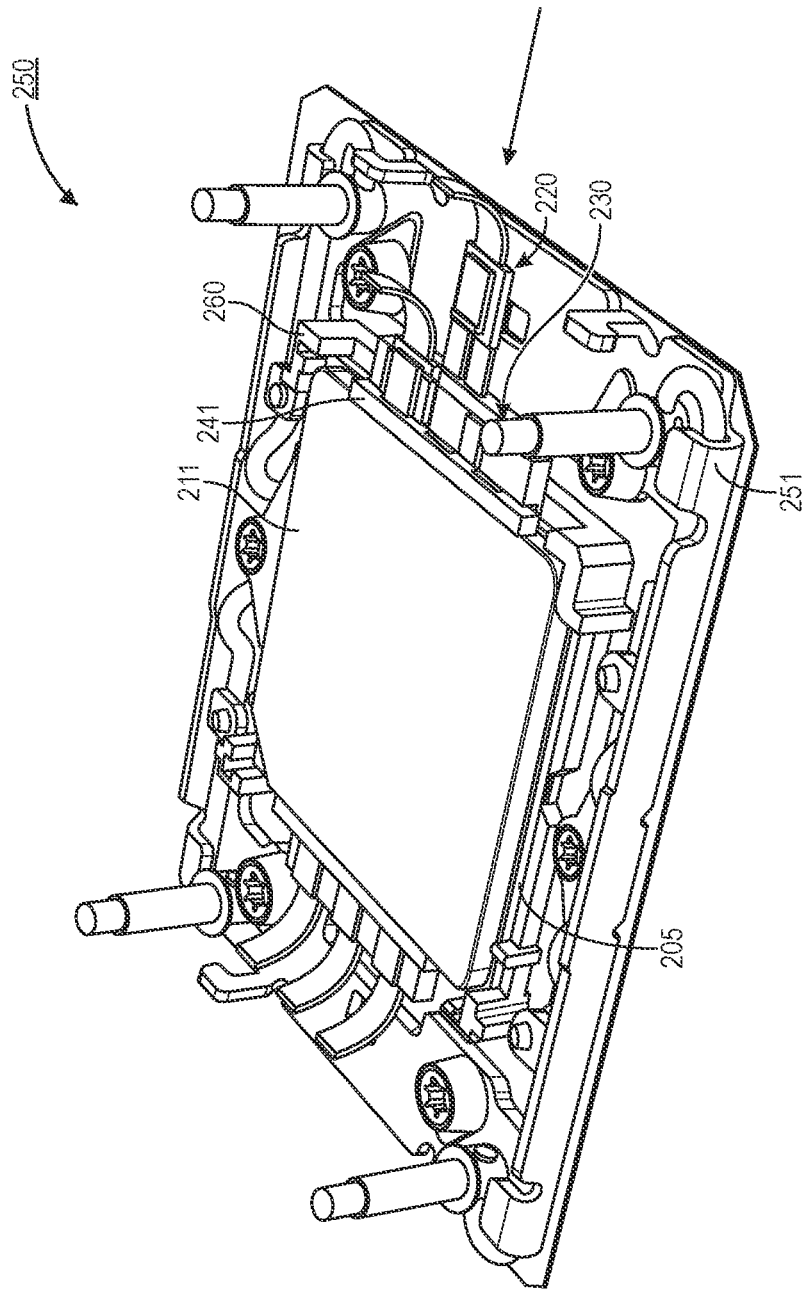
FIG. 2B is a perspective view illustration of a photonics system that includes a socketed connection to the board, where the expanded beam connectors are insertable and removable from the side of the system, in accordance with an embodiment.

Referring now to FIG. 2B, a perspective view illustration of the photonics system 250 after the socketing process to attach the package substrate 205 to the socket 260 is shown, in accordance with an embodiment. As shown by the arrow, plugs 220 may still be inserted and/or retracted from the receptacles 230. Removal or insertion of the plugs 220 at this point in the assembly eases the necessary work needed to reconfigure the photonics system 250.

Figure 3:
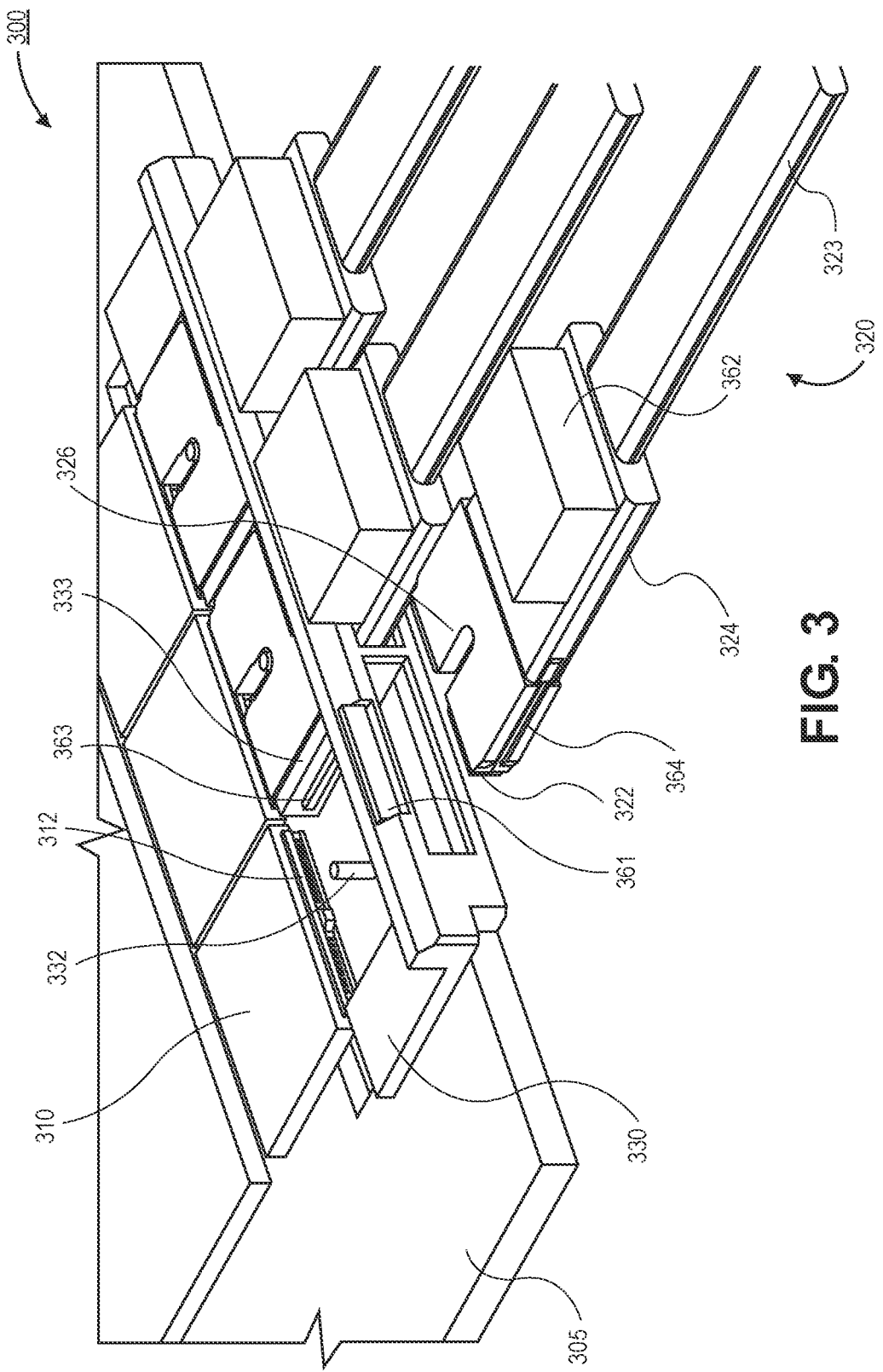
FIG. 3 is a perspective view illustration of a photonics package that comprises pluggable expanded beam connectors that are plugged into a receptacle on the package substrate, in accordance with an embodiment.

Referring now to FIG. 3, a perspective view illustration of a photonics package 300 is shown, in accordance with an additional embodiment. The photonics package 300 comprises a package substrate 305 with a plurality of photonics dies 310. A receptacle 330 for receiving plugs 320 is integrated with the package substrate 305. In an embodiment, die side lens arrays 312 are provided on the end surfaces of the photonics dies 310.

In an embodiment, the receptacle 330 may comprise a plurality of regions for receiving the plugs 320. Each region may be defined by walls 333. In an embodiment, the walls 333 may also comprise an alignment feature ridges 363. For example ridges 363 may be provided along the walls 333. The alignment feature ridges 363 may interface with grooves 364 on the plug 320. In other embodiments, the walls 333 may have a groove, and the ridge may be provided on the plug 320. The presence of the alignment feature ridges 363 may minimize the reliance on the alignment posts 332 for providing proper rotational alignment. As such, one of the two alignment posts 332 may be omitted. The single remaining alignment post 332 may be used as a stopper in order to prevent the plug 320 from being inserted too far and possibly damaging the die side lens array 312.

In an embodiment, the plug 320 may be similar to the plugs described above. For example, the plug 320 may comprise a plug housing 324 and a fiber ribbon 323. Optical fibers (not shown) may pass through the plug housing 324 and exit via the fiber ribbon 323. The plug 320 may also comprise an alignment notch 326 for interfacing with the alignment post 332, and a plug side lens array 322. In an embodiment, a groove 364 or ridge may also be provided along outer sidewalls of the plug housing 324 in order to interface with the alignment feature ridges 363 of the receptacle 330.

In contrast to the plugs described above, the latching mechanism of the plug 320 is magnetic instead of a mechanical clip. For example, a magnetic block 362 may be placed over the plug housing 324. The magnetic block 362 may be magnetically attracted to a magnet 361 on the receptacle 330. As such, upon insertion of the plug 320, the plug is fixed in place with a magnetic force. The magnetic force may be overcome manually when the plug 320 is desired to be removed.

Figure 4:
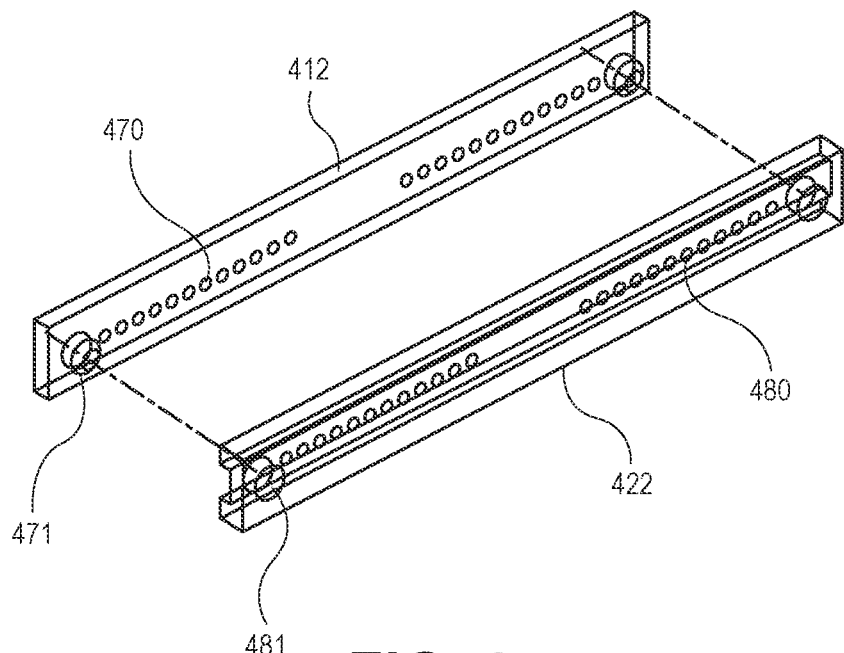
FIG. 4 is a perspective view illustration of a lens array on the die side and a lens array on the plug side that comprise alignment features, in accordance with an embodiment.

Referring now to FIG. 4, a perspective view illustration of the die side lens array 412 and the plug side lens array 422 is shown, in accordance with an embodiment. In an embodiment, both lens arrays 412 and 422 may comprise an optically clear material, such as glass. Individual lenses 470 may be formed on the die side lens array 412 and individual lenses 480 may be formed on the plug side lens array 422. In order to properly align the lenses 480 with the lenses 470, a fine alignment feature may be provided on the lens arrays 412 and 422. For example, posts 471 may be provided on the die side lens array 412 and holes 481 for receiving the posts 471 may be provided on the plug side lens array 422. In other embodiments, the posts may be provided on the plug side and the holes may be provided on the die side. In an embodiment, the individual lenses 470 and 480 may be provided in a row between the posts 471 and holes 481, respectively.

Figure 5A:
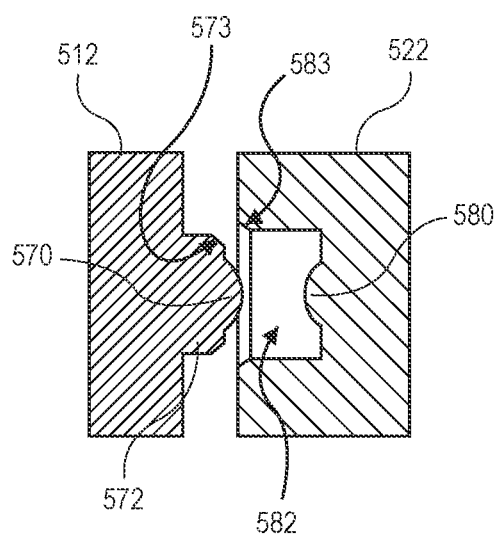
FIG. 5A is a cross-sectional illustration of a fine alignment feature around the die side lens and the plug side lens, in accordance with an embodiment.
Figure 5B:
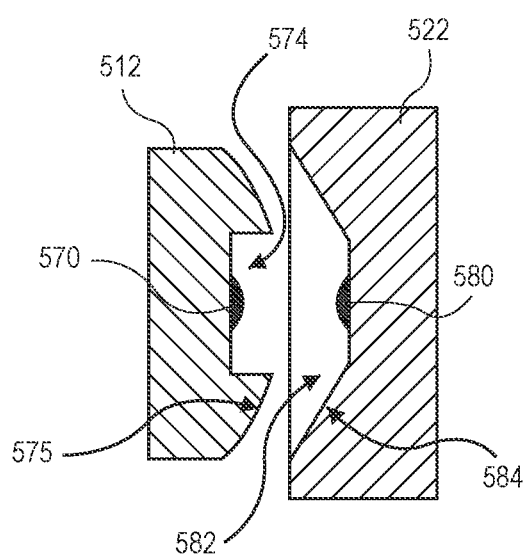
FIG. 5B is a cross-sectional illustration of a fine alignment feature around the die side lens and the plug side lens, in accordance with an embodiment.

Referring now to FIGS. 5A and 5B, zoomed in illustrations of individual lenses 570 of the die side lens array 512 and individual lenses 580 of the plug side lens array 522 are shown, in accordance with various embodiments.

In FIG. 5A the lens 570 is provided on a pedestal 572. The pedestal 572 may have angled corners 573 in order to provide a passive alignment feature. The lens 580 on the plug side lens array 522 may be formed in a trench 582. The trench 582 may be sized to receive the pedestal 572. Angled corners 583 of the trench 582 may interface with the angled corners 573 of the pedestal 572 in order to properly align the two lenses together as the plug side lens array 522 is brought close to the die side lens array 512. In an embodiment, the lens 580 is prevented from touching the lens 570 by mechanical features of the plug, such as those described in greater detail above.

Referring now to FIG. 5B, a cross-section of the lens arrays 512 and 522 are shown, in accordance with an additional embodiment. As shown, the die side lens array 512 comprises a lens 570 in a trench 574. The outer surface 575 of the trench 574 may be rounded. On the plug side lens array 522, the lens 580 may be provided in trench 582. The trench 582 may have an angled surface 584. As the two lenses 580 and 570 are brought together, the interface of the angled internal wall 584 and the rounded surface 575 act to align the two lenses 580 and 570. The two interfacing surfaces 584 and 575 may also be shaped to provide self-correcting aspects to address angularity sensitivities. Any off angle on one lens would cause a lateral shift to the final contacting and mated position. The interface shape could optimize the shift to re-align the collimated beam to a new optimum position based on the off-angle.

Figure 6:
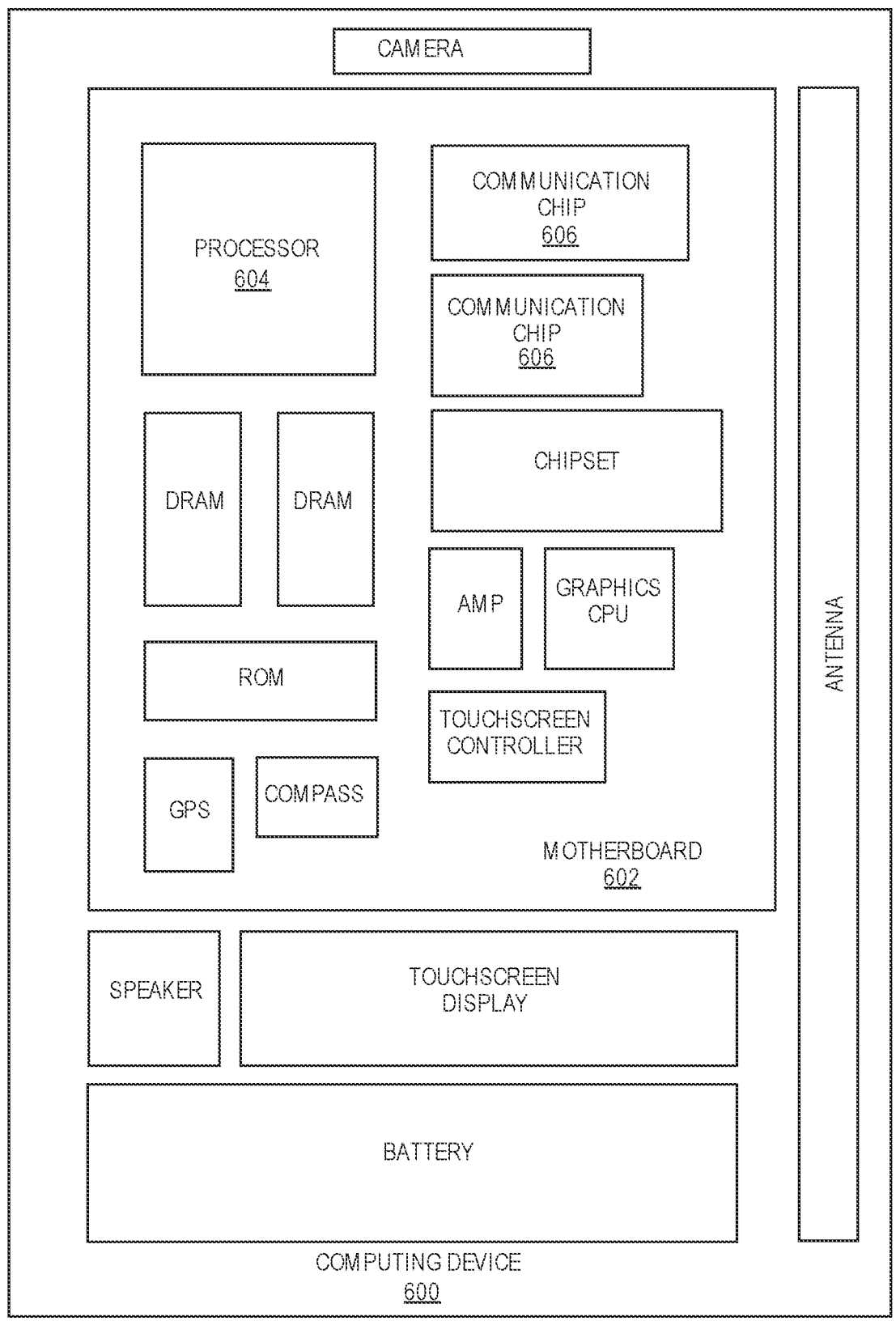
FIG. 6 is a schematic of a computing device built in accordance with an embodiment.

FIG. 6 illustrates a computing device 600 in accordance with one implementation of the invention. The computing device 600 houses a board 602. The board 602 may include a number of components, including but not limited to a processor 604 and at least one communication chip 606. The processor 604 is physically and electrically coupled to the board 602. In some implementations the at least one communication chip 606 is also physically and electrically coupled to the board 602. In further implementations, the communication chip 606 is part of the processor 604.

These other components include, but are not limited to, volatile memory (e.g., DRAM), non-volatile memory (e.g., ROM), flash memory, a graphics processor, a digital signal processor, a crypto processor, a chipset, an antenna, a display, a touchscreen display, a touchscreen controller, a battery, an audio codec, a video codec, a power amplifier, a global positioning system (GPS) device, a compass, an accelerometer, a gyroscope, a speaker, a camera, and a mass storage device (such as hard disk drive, compact disk (CD), digital versatile disk (DVD), and so forth).

The communication chip 606 enables wireless communications for the transfer of data to and from the computing device 600. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 606 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 600 may include a plurality of communication chips 606. For instance, a first communication chip 606 may be dedicated to shorter range wireless communications such as Wi-Fi and Bluetooth and a second communication chip 606 may be dedicated to longer range wireless communications such as GPS, EDGE, GPRS, CDMA, WiMAX, LTE, Ev-DO, and others.

The processor 604 of the computing device 600 includes an integrated circuit die packaged within the processor 604. In some implementations of the invention, the integrated circuit die of the processor may be part of a photonics system that comprises a receptacle to enable a pluggable optical connection, in accordance with embodiments described herein. The term "processor" may refer to any device or portion of a device that processes electronic data from registers and/or memory to transform that electronic data into other electronic data that may be stored in registers and/or memory.

The communication chip 606 also includes an integrated circuit die packaged within the communication chip 606. In accordance with another implementation of the invention, the integrated circuit die of the communication chip may be part of a photonics system that comprises a receptacle to enable a pluggable optical connection, in accordance with embodiments described herein.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize.

These modifications may be made to the invention in light of the above detailed description. The terms used in the following claims should not be construed to limit the invention to the specific implementations disclosed in the specification and the claims. Rather, the scope of the invention is to be determined entirely by the following claims, which are to be construed in accordance with established doctrines of claim interpretation.

Example 1: a photonics package, comprising: a package substrate, wherein the package substrate comprises a cutout along an edge of the package substrate; a photonics die coupled to the package substrate, wherein the photonics die is positioned adjacent to the cutout; and a receptacle for receiving a pluggable optical connector, wherein the receptacle is over the cutout.

Example 2: the photonics package of Example 1, wherein the receptacle comprises an alignment feature.

Example 3: the photonics package of Example 2, wherein the alignment feature comprises a first post and a second post.

Example 4: the photonics package of Examples 1-3, wherein the receptacle comprises a clip anchor, wherein the clip anchor secures a clip of the pluggable optical connector.

Example 5: the photonics package of Examples 1-4, wherein the receptacle comprises alignment ridges for interfacing with alignment grooves on the pluggable optical connector.

Example 6: the photonics package of Examples 1-5, wherein the receptacle comprises a magnet for securing the pluggable optical connector.

Example 7: the photonics package of Examples 1-6, further comprising: a lens over an edge of the photonics die.

Example 8: the photonics package of Example 7, wherein the lens is a collimating lens.

Example 9: the photonics package of Example 7 or Example 8, wherein the lens comprises a fine alignment feature to properly align the lens to a second lens on the pluggable optical connector.

Example 10: a pluggable optical connector, comprising: a plug housing, wherein the plug housing has an alignment notch to separate a first portion of the plug housing from a second portion of the plug housing; first optical fibers in the first portion of the plug housing; second optical fibers in the second portion of the plug housing; a latching feature over a first surface of the plug housing; and a spring affixed to a second surface of the plug housing.

Example 11: the pluggable optical connector of Example 10, wherein the spring has a spring notch that is aligned with the alignment notch.

Example 12: the pluggable optical connector of Example 10 or Example 11, wherein the first optical fibers and the second optical fibers are coupled together in a fiber ribbon.

Example 13: the pluggable optical connector of Examples 10-12, further comprising: a first lens array over ends of the first optical fibers; and a second lens array over ends of the second optical fibers.

Example 14: the pluggable optical connector of Example 13, wherein the first lens array and the second lens array comprise alignment features for providing fine alignment to a lens on a photonics die.

Example 15: the pluggable optical connector of Examples 10-14, wherein the latching feature is a clip.

Example 16: the pluggable optical connector of Examples 10-14, wherein the latching feature is a magnet.

Example 17: the pluggable optical connector of Examples 10-16, further comprising: grooves along sidewall surfaces of the plug housing.

Example 18: the pluggable optical connector of Examples 10-17, wherein the spring extends over the first portion of the plug housing and the second portion of the plug housing.

Example 19: the pluggable optical connector of Examples 10-18, wherein the alignment notch is sized to interface with a first post and a second post of a plug receptacle.

Example 20: a photonics package, comprising: a board; a package substrate coupled to the board by a socket; a photonics die coupled to the package substrate; and a plug receptacle integrated into the socket, wherein the plug receptacle is configured to receive an optical connector for interfacing with the photonics die.

Example 21: the photonics package of Example 20, further comprising: the optical connector inserted into the plug receptacle.

Example 22: the photonics package of Example 21, wherein the optical connector is inserted into the plug receptacle before attaching the package substrate to the board.

Example 23: the photonics package of Example 21, wherein the optical connector is configured to be removable from the plug receptacle after the package substrate is attached to the board.

Example 24: the photonics package of Examples 20-23, wherein the plug receptacle comprises a first alignment post and a second alignment post.

Example 25: the photonics package of Examples 20-24, wherein the plug receptacle further comprises a clip anchor, wherein the clip anchor secures a clip of the optical connector.

What is claimed is:

1. A photonics package, comprising:
    a package substrate, wherein the package substrate comprises a cutout along an edge of the package substrate;
    a photonics die coupled to the package substrate, wherein the photonics die overhangs the cutout; and
    a receptacle for receiving a pluggable optical connector, wherein the receptacle is over the cutout.

2. The photonics package of claim 1, wherein the receptacle comprises an alignment feature.

3. The photonics package of claim 2, wherein the alignment feature comprises a first post and a second post.

4. The photonics package of claim 1, wherein the receptacle comprises a clip anchor, wherein the clip anchor secures a clip of the pluggable optical connector.

5. The photonics package of claim 1, wherein the receptacle comprises alignment ridges for interfacing with alignment grooves on the pluggable optical connector.

6. The photonics package of claim 1, wherein the receptacle comprises a magnet for securing the pluggable optical connector.

7. The photonics package of claim 1, further comprising:
    a lens over an edge of the photonics die.

8. The photonics package of claim 7, wherein the lens is a collimating lens.

9. The photonics package of claim 7, wherein the lens comprises a fine alignment feature to properly align the lens to a second lens on the pluggable optical connector.

10. A pluggable optical connector, comprising:
    a plug housing, wherein the plug housing has an alignment notch to separate a first portion of the plug housing from a second portion of the plug housing, wherein the plug housing is adapted to plug into a plug receptical over a cutout in a package substrate, wherein a photonics die coupled to the package substrate overhangs the cutout;
    first optical fibers in the first portion of the plug housing;
    second optical fibers in the second portion of the plug housing;
    a latching feature over a first surface of the plug housing; and
    a spring affixed to a second surface of the plug housing.

11. The pluggable optical connector of claim 10, wherein the spring has a spring notch that is aligned with the alignment notch.

12. The pluggable optical connector of claim 10, wherein the first optical fibers and the second optical fibers are coupled together in a fiber ribbon.

13. The pluggable optical connector of claim 10, further comprising:
    a first lens array over ends of the first optical fibers; and
    a second lens array over ends of the second optical fibers.

14. The pluggable optical connector of claim 13, wherein the first lens array and the second lens array comprise alignment features for providing fine alignment to a lens on the photonics die.

15. The pluggable optical connector of claim 10, wherein the latching feature is a clip.

16. The pluggable optical connector of claim 10, wherein the latching feature is a magnet.

17. The pluggable optical connector of claim 10, further comprising:
    grooves along sidewall surfaces of the plug housing.

18. The pluggable optical connector of claim 10, wherein the spring extends over the first portion of the plug housing and the second portion of the plug housing.

19. The pluggable optical connector of claim 10, wherein the alignment notch is sized to interface with a first post and a second post of the plug receptacle.

20. A photonics package, comprising:
    a board;
    a package substrate coupled to the board by a socket, wherein the package substrate comprises a cutout along an edge of the package substrate;
    a photonics die coupled to the package substrate, wherein the photonics die overhangs the cutout; and
    a plug receptacle integrated into the socket, wherein the plug receptacle is configured to receive an optical connector for interfacing with the photonics die.

21. The photonics package of claim 20, further comprising:
    the optical connector inserted into the plug receptacle.

22. The photonics package of claim 21, wherein the optical connector is inserted into the plug receptacle before attaching the package substrate to the board.

23. The photonics package of claim 21, wherein the optical connector is configured to be removable from the plug receptacle after the package substrate is attached to the board.

24. The photonics package of claim 20, wherein the plug receptacle comprises a first alignment post and a second alignment post.

25. The photonics package of claim 20, wherein the plug receptacle further comprises a clip anchor, wherein the clip anchor secures a clip of the optical connector.

* * * * *